No. 726,125. PATENTED APR. 21, 1903.
A. WETZEL.
SPEED INDICATING AND REGULATING APPARATUS.
APPLICATION FILED MAR. 6, 1902.
NO MODEL. 2 SHEETS—SHEET 1.

Witnesses
Thomas Kilpatrick
H. van Heerenbrink

Inventor
Albert Wetzel
by Alexander & Co.
Attorneys

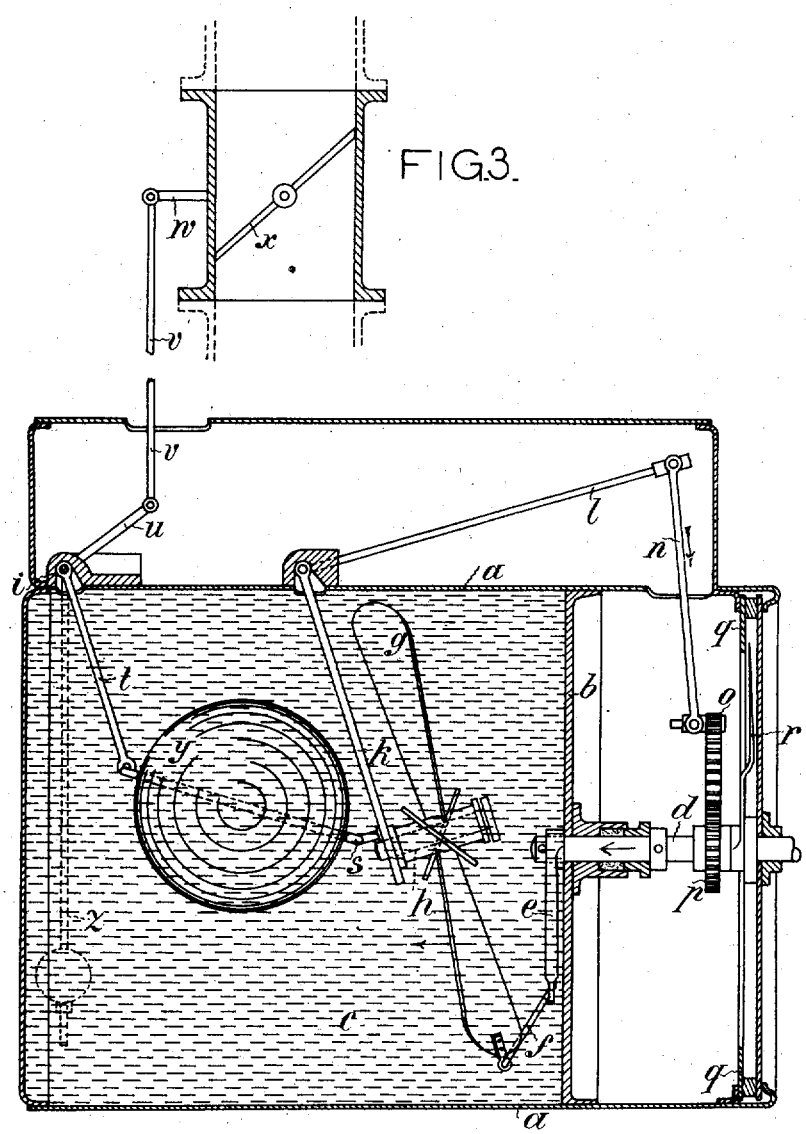

UNITED STATES PATENT OFFICE.

ALBERT WETZEL, OF STUTTGART, GERMANY.

SPEED INDICATING AND REGULATING APPARATUS.

SPECIFICATION forming part of Letters Patent No. 726,125, dated April 21, 1903.

Application filed March 6, 1902. Serial No. 96,942. (No model.)

*To all whom it may concern:*

Be it known that I, ALBERT WETZEL, a subject of the King of Würtemberg, residing at 22 Uhlandstrasse, Stuttgart, in the Kingdom of Würtemberg and Empire of Germany, have invented new and useful Improvements in Speed Indicating and Regulating Apparatus, of which the following is a specification.

My invention relates to speed indicating or regulating apparatus which may be employed either for stationary or portable engines—such as hoisting-engines, locomotives—or for vehicles—such as motor-carriages, tram-cars, ships—or for measuring the pressure of air and many other purposes. The principle underlying the construction of this apparatus is as follows: A propeller or like screw set in rotation by the shaft of the engine or vehicle exerts upon the surrounding liquid, air, or other fluid a pressure, causing the displacement of the screw in the direction of its axis. This displacement, the amount of which varies according to the speed of the driving-shaft and the corresponding pressure of the screw as it overcomes more or less the pressure opposing the same, is transmitted either to an indicating or registering mechanism or to the distributing-gear of the engine.

In the accompanying drawings I have shown by way of example two of the numerous constructional forms of this invention.

Figure 1:
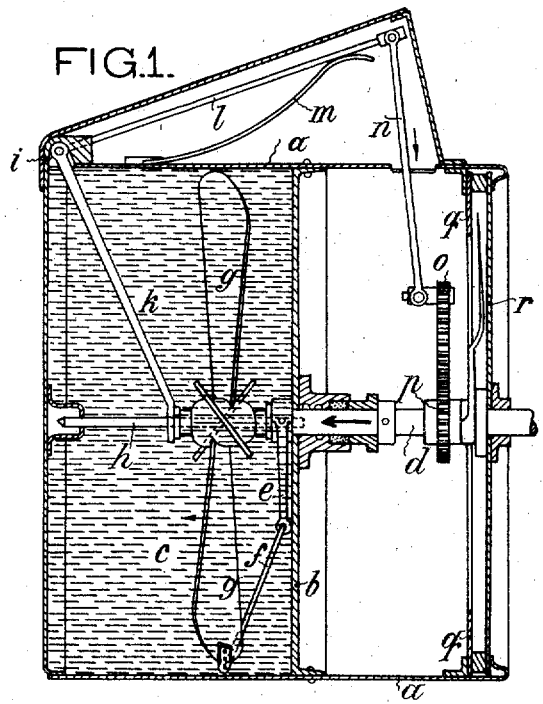
Figure 2:
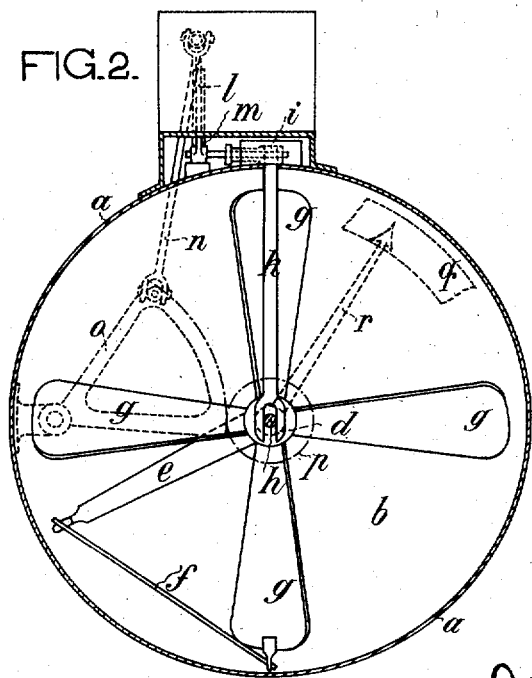

Figure 1 is a longitudinal section representing the apparatus in the form of a speed-indicator. Fig. 2 is a sectional end elevation of the same. Fig. 3 is a longitudinal section showing the apparatus in the form of a speed indicator and regulator.

The cylindrical casing $a$, Figs. 1 and 2, which is divided into two compartments by the partition $b$, contains in the compartment $c$ a fluid, preferably glycerin or oil, to prevent rusting of the inner parts and to keep them continually lubricated at the same time. Within this liquid rotates a propeller-screw $g$, driven by the shaft $d$ through the intervention of the arm $e$ and connecting-rod $f$. This screw, which is mounted loose upon the axis $h$, constituting the prolongation of the driving-shaft $d$ and firmly connected therewith, is displaced in the direction of the arrow on the driving-shaft turning in a certain direction. The shaft $h$ may also be firmly connected with the left wall of the casing $a$ and supported in the left end of the shaft $d$. Moreover, the screw may be rigidly connected with the axis $h$, so as to be displaced conjointly with the same. In the displacement of the screw the lever $k$, pivoted at $i$ and bearing with its free end against the nave of the screw, and also the lever $l$, firmly connected with the lever $k$ by the pivot, so as to form a bell-crank, receive in opposition to the spring $m$ a movement which is transmitted to the toothed segment $o$ by means of the connecting-rod $n$. This segment gears with the toothed wheel $p$, mounted loose upon the driving-shaft $d$ and having firmly connected to it the index $r$, adapted to turn in front of the graduated scale $q$. The greater the speed of the driving-shaft $d$ and of the propeller-screw $g$ the greater is the force opposing the tension of the spring $m$ in the direction of the arrow, and thus also the displacement of the propeller-screw, the turning movement of the levers $k$ and $l$, and that of the index $r$. This index, the turning movement of which thus depends on the speed of the shaft $d$ and on the shaft of the engine or vehicle driving the same, indicates this speed on the graduated scale, which is determined empirically.

In order to obviate the sliding friction produced in the displacement of the propeller-screw $g$ upon its axis $h$, the latter may be firmly connected with the lever $k$ instead of with the shaft $d$, so that it will be displaced with the screw, Fig. 3.

In the arrangement represented in Fig. 3 the displacement of the propeller-screw $g$ or the turning movement of the lever $k$ serves not only for transmitting movement to the index $r$, but also for acting upon the regulating or distributing gear (throttle-valve $x$) of a motor through the agency of the lever mechanism $s\,t\,u\,v\,w$. Upon the rod $s$, connecting the levers $k$ and bell-crank $t\,u$, is arranged a float $y$, which by the buoyancy of the liquid inclosed in the casing compensates for the gravity of the propeller-screw and lever mechanism, thereby increasing the sensitiveness of the apparatus. The float may also be fixed directly to the screw or in any other suitable manner. In lieu of the spring $m$ a pendulum $z$, provided with an adjustable weight, is employed in this case.

It is evident that the above-described arrangement may also be used as a speed-regulator alone.

What I claim as my invention, and desire to secure by Letters Patent, is—

1. Apparatus of the character described, comprising, in combination, a casing having a compartment filled with a fluid, a propeller-screw capable of axial movement and arranged to turn in the compartment, a driving-shaft, a flexible connection between the driving-shaft and a blade of the screw, a graduated scale, an index, and means for transmitting the axial movement of the screw to the index, substantially as specified.

2. Apparatus of the character set forth, comprising a casing having a compartment containing a fluid, a propeller-screw capable of displacement in said compartment and adapted to turn therein, a driving-shaft, a flexible connection between the driving-shaft and a blade of the screw, a graduated scale, an index, a bell-crank lever operated by the displacement of the propeller-screw, and actuating the index, and means for maintaining the propeller in normal position.

3. Apparatus of the character described comprising, in combination, a casing having a compartment filled with a fluid, a driving-shaft extending into the compartment, a bell-crank pivoted to a wall of this compartment, a propeller-screw having its shaft supported in one arm of the bell-crank and a blade connected to an arm of the driving-shaft, a graduated scale, an index and means for connecting the other arm of the said bell-crank to the index, substantially as specified.

4. Apparatus of the character described comprising, in combination, a casing having a compartment filled with a fluid, a driving-shaft, a bell-crank pivoted to the wall of the compartment, a screw-propeller having a shaft supported in one arm of the bell-crank, the other arm of which is connected to an index, and a float connected with the arm supporting the screw-propeller, substantially as specified.

In testimony whereof I have signed my name to this specification in the presence of two subscribing witnesses.

ALBERT WETZEL.

Witnesses:
JULIUS WIDMANN,
ERNST ENTENMAS.